United States Patent
Jia et al.

(10) Patent No.: US 7,705,913 B2
(45) Date of Patent: Apr. 27, 2010

(54) UNIFIED APPROACH TO FILM MODE DETECTION

(75) Inventors: Yunwei Jia, Milton (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1162 days.

(21) Appl. No.: 11/314,631

(22) Filed: Dec. 20, 2005

(65) Prior Publication Data

US 2007/0139552 A1 Jun. 21, 2007

(51) Int. Cl.
*H04N 11/20* (2006.01)
*H04N 7/01* (2006.01)
*H04N 5/14* (2006.01)

(52) U.S. Cl. .................. 348/448; 348/97; 348/441; 348/701

(58) Field of Classification Search .......... 348/441, 348/452–453, 448, 456, 459, 558, 97, 700–701; H04N 11/20, 7/01, 5/14
See application file for complete search history.

(56) References Cited

U.S. PATENT DOCUMENTS

| | | | |
|---|---|---|---|
| 6,115,499 A * | 9/2000 | Wang et al. | 382/232 |
| 6,891,571 B2 * | 5/2005 | Shin et al. | 348/448 |
| 7,239,353 B2 * | 7/2007 | Lee et al. | 348/441 |
| 7,369,179 B1 * | 5/2008 | Lippman | 348/558 |
| 2003/0189667 A1 * | 10/2003 | Chow | 348/441 |
| 2005/0253964 A1 * | 11/2005 | Janssen et al. | 348/459 |
| 2006/0244823 A1 * | 11/2006 | Chen et al. | 348/97 |

OTHER PUBLICATIONS

Yunwei Jia, Lowell Winger and Elliot Linzer, Method for Robust Inverse Telecine, U.S. Appl. No. 11/272,300, filed Nov. 10, 2005.

* cited by examiner

*Primary Examiner*—Trang U Tran
(74) *Attorney, Agent, or Firm*—Christopher P. Maiorana, PC (57) ABSTRACT

A method for film mode detection is disclosed. The method generally includes the steps of (A) detecting if a plurality of fields in a video signal are in a 3:2 pull-down pattern to control a plurality of first flags based on a plurality of statistics gathered from the fields, (B) detecting if the fields contain moving interlaced text to control a second flag based on both (i) the statistics and (ii) a repeat-field flag of the first flags that indicates repeating consecutive same polarity fields and (C) deciding among a plurality of inverse telecine processes to de-interlace the fields based on all of (i) a 3:2 mode flag of the first flags, (ii) a 3:2 direction flag of the first flags and (iii) the second flag.

29 Claims, 6 Drawing Sheets

UNIFIED APPROACH TO FILM MODE DETECTION

CROSS REFERENCE TO RELATED APPLICATIONS

This application is related to U.S. patent application Ser. No. 11/272,300, filed Nov. 10, 2005, which is hereby incorporated by reference in its entirety.

FIELD OF THE INVENTION

The present invention relates to inverse telecine generally and, more particularly, to a unified approach to film mode detection.

BACKGROUND OF THE INVENTION

Films are commonly shot at 24 frames per second. In order to play a film on a television set smoothly, the film has to be converted to either a National television System Committee (NTSC) video format (i.e., interlaced 60 fields per second), or a Phase Alternate Line (PAL) video format (i.e., interlaced 50 fields per second) in a process called telecine. Two telecine methods are commonly used, as described in the following. In converting a film to NTSC video, each frame $F_i$ of the film is decomposed into two fields of video (i.e., a top field $T_i$ and a bottom field $B_i$) and every four fields are followed by a field that repeats a preceding same-parity field. For example, if the frame sequence of the film is $F_0 F_1 F_2 F_3 F_4 \ldots$, the resulting field sequence of video is $T_0 B_0 T_1 B_1 T_1 B_2 T_2 B_3 T_3 B_3 T_4 B_4 \ldots$. The above telecine method is called a 3:2 pull-down method. When a film is converted into PAL video, each frame of the film is simply decomposed into two fields of video and no repeated fields are inserted. For example, if the frame sequence of the film is $F_0 F_1 F_2 F_3 F_4 \ldots$, the resulting field sequence of video is $T_0 B_0 T_1 B_1 T_2 B_2 T_3 B_3 T_4 B_4 \ldots$. The above telecine method is called a 2:2 pull-down method. In converting a film to PAL video using the 2:2 pull-down method, the converted video runs 4% faster than the original film. Furthermore, the 2:2 pull-down method is sometimes used in converting portions of a film into NTSC video, especially for fast pans in which the 3:2 pull-down method may cause a jerky impression to the viewer.

To display an interlaced video sequence on a progressive device smoothly, such as an LCD TV or a Plasma TV, the video sequence is converted to a progressive sequence. The conversion process is called a de-interlacing method. Many conventional de-interlacing techniques exist, such as "bob", "weave", directional interpolation, motion adaptive blending and motion compensated blending. Among the conventional methods, the "bob" method and the "weave" method are the two simplest methods. In the "bob" method, a progressive frame is generated from a field by simple vertical interpolation within the field. In the "weave" method, a progressive frame is generated by simply interleaving two neighboring opposite-parity fields. The "bob" method is normally used for scenes with fast motion when motion compensation is unavailable or unreliable. The "weave" method is normally used for stationary scenes because the full vertical resolution of the scenes is retained.

In a case where a video sequence is generated from a film through the 3:2 pull-down or the 2:2 pull-down, a perfect de-interlacing can be achieved for the sequence if a correct determination can be made of which two fields in the input sequence originated from a same progressive frame. In particular, a determination should be made whether a current field $f_N$ should be "weaved" with a previous field $f_{N-1}$ since $f_N$ and $f_{N-1}$ originated from the same progressive frame, or the current field $f_N$ should be "weaved" with a next field $f_{N+1}$ since $f_N$ and $f_{N+1}$ originated from the same progressive frame. The process of combining the interlaced fields back into the original frames is called inverse telecine.

The inverse telecine processes are often more complicated than expected due to several reasons, such as noise introduced in the video processing chain, scene changes and post-edit. In an example case of post-edit, interlaced text is frequently added to a video sequence for the purpose of distributing breaking news, weather alert, stock information, copyright and the like. The added text often scrolls horizontally or vertically across the picture. If a sequence of fields with scrolling text is detected as regular 3:2 pull-downed or 2:2 pull-downed fields and the "weave" method is used to de-interlace, noticeable interlacing artifacts will often appear around the moving text.

In another example case of post-edit, the 3:2 pull-down method and the 2:2 pull-down method sometimes coexist in various sequences, where the 3:2 pull-down method is used for normal scenes and the 2:2 pull-down method is used for pans or scenes with fast motion to avoid motion jitters. Therefore, if the segments with the 2:2 pull-down are not correctly detected, such segments will look blurry after de-interlacing, which may be visually disturbing for some motion-tracking viewers.

In some existing approaches, 3:2 pull-down fields and 2:2 pull-down fields are not detected together. For example, when NTSC sequences are examined, only the 3:2 pull-down detection is performed and the 2:2 pull-down detection is not performed. For sequences with mixed 3:2 pull-down and 2:2 pull-down segments, the conventional approaches normally classify the 2:2 pull-downed segments as interlaced, which will in turn causes the "weave" method not to be used for such segments. As a result, the 2:2 pull-downed segments will appear blurry.

Some conventional approaches try to detect blocks with interlaced artifacts in a picture. Whenever a block with interlaced artifacts is detected, the whole picture is declared as interlaced. The conventional approaches are quite often noise-sensitive (i.e., some progressive blocks with noise may be detected as interlaced).

SUMMARY OF THE INVENTION

The present invention concerns a method for film mode detection. The method generally comprises the steps of (A) detecting if a plurality of fields in a video signal are in a 3:2 pull-down pattern to control a plurality of first flags based on a plurality of statistics gathered from the fields, (B) detecting if the fields contain moving interlaced text to control a second flag based on both (i) the statistics and (ii) a repeat-field flag of the first flags that indicates repeating consecutive same polarity fields and (C) deciding among a plurality of inverse telecine processes to de-interlace the fields based on all of (i) a 3:2 mode flag of the first flags, (ii) a 3:2 direction flag of the first flags and (iii) the second flag.

The objects, features and advantages of the present invention include providing a unified approach to film mode detection that may (i) properly handle mixed contents in which 3:2 pull-down, 2:2 pull-down and moving interlaced text may coexist in a sequence with interlaced material, (ii) use a single set of field statistics for the 3:2 pull-down detection, 2:2 pull-down detection and moving interlaced text detection and/or (iii) save computation costs compared with separate detections of the 3:2 pull-down, 2:2 pull-down and moving text.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
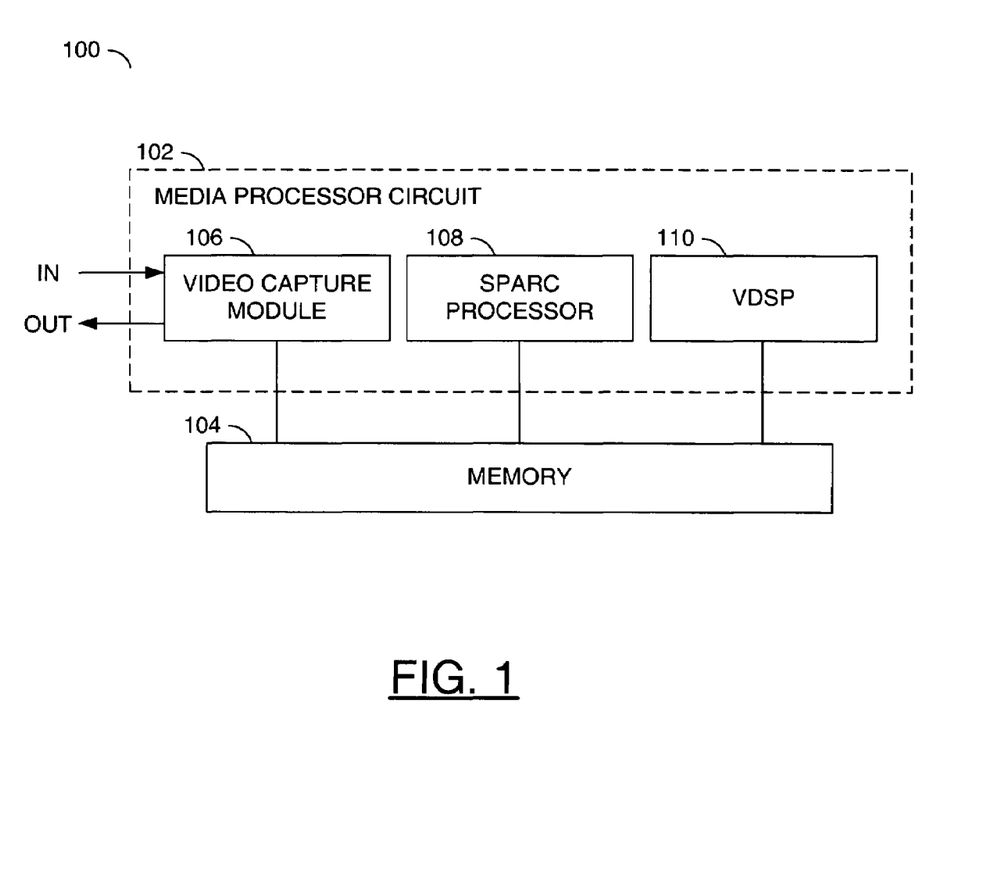
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system (or circuit) 100 may be referred to as a network media system. The network media system 100 generally comprises a circuit (or module) 102 and a circuit (or module) 104. An input signal (e.g., IN) may be received by the circuit 102. The circuit 102 may generate an output signal (e.g., OUT). The circuit 102 may be in communication with the circuit 104 to move video data and video-related information back and forth.

The signal IN may be an analog video signal that has undergone telecine processing. The signal IN generally comprises a sequence of interlaced-format fields created from a sequence of film frames and/or a sequence of cartoon frames. The signal OUT may be an analog video signal. The signal OUT generally comprises a sequence of progressive-format frames with some possible interlaced fields mixed within. The frames may be created by inverse telecine processing the interlaced fields received in the signal IN.

The circuit 102 may be referred to as a media processor circuit. The media processor circuit 102 may be operational to gather statistics on the fields from the video signal IN. The media processor circuit 102 may also detect if the fields are in a 3:2 pull-down pattern to control a plurality of 3:2 pull-down flags based on a plurality of statistics gathered from the fields. Substantially simultaneously, the media processor circuit 102 may detect if the fields contain moving interlaced text to control a moving interlaced text flag based on both (i) the statistics and (ii) a repeat-field flag of the 3:2 pull-down flags that indicates a repeating consecutive same polarity field. The media processor may be further configured to detect if the fields are in a 2:2 pull-down pattern based on the statistics to control a plurality of 2:2 pull-down flags. Furthermore, the media processor circuit 102 may decide among a plurality of inverse telecine processes to de-interlace said fields based on all of (i) a 3:2 mode flag, (ii) a 3:2 direction flag, (iii) the moving interlaced text flag, (iv) a 2:2 mode flag and (v) a 2:2 direction flag. A decision may then be made to allocate one or more inverse telecine processes to convert the interlaced fields into frames based on the flags. The decision may include a solution not to inverse telecine the fields, thus presenting the interlaced fields in the signal OUT.

The circuit 104 may be referred to as a memory circuit. The memory circuit 104 may be operational to temporarily buffer digital versions of the interlaced fields and digital versions of the progressive frames. The memory circuit 104 may be implemented as a single data rate (SDR) dynamic random access memory (DRAM) or a double data rate (DDR) DRAM. Other memory technologies may be implemented to meet the criteria of a particular application.

The media processor circuit 102 generally comprises a circuit (or module) 106, a circuit (or module) 108 and a circuit (or module) 110. The circuit 106 may receive the signal IN. The signal OUT may be generated and presented by the circuit 106. All three of the circuits 106, 108 and 110 may be in communication with the memory circuit 104 to read and write video data, video-related information and other data.

The circuit 106 may be referred to as a video capture circuit. The video capture circuit 106 may be operational to (i) capture (e.g., digitize) the interlaced fields from the signal IN and (ii) generate the signal OUT. In some embodiments, the video capture circuit 106 may also be operational to gather statistics from the fields of the signal IN.

The circuit 108 may be referred to as a processor circuit. The processor circuit 108 may be operational control the overall operations of the network media system 100. The processor circuit 108 may be implemented as a SPARC processor. Other processor technologies may be implemented to meet the criteria of a particular application.

The circuit 110 may be referred to as a video digital signal processor (VDSP) circuit. The VDSP circuit 110 may be operational to perform high speed processing on the video data. In some embodiments, the VDSP circuit 110 may be operational to gather the statistics from the fields in the signal IN.

Figure 2:
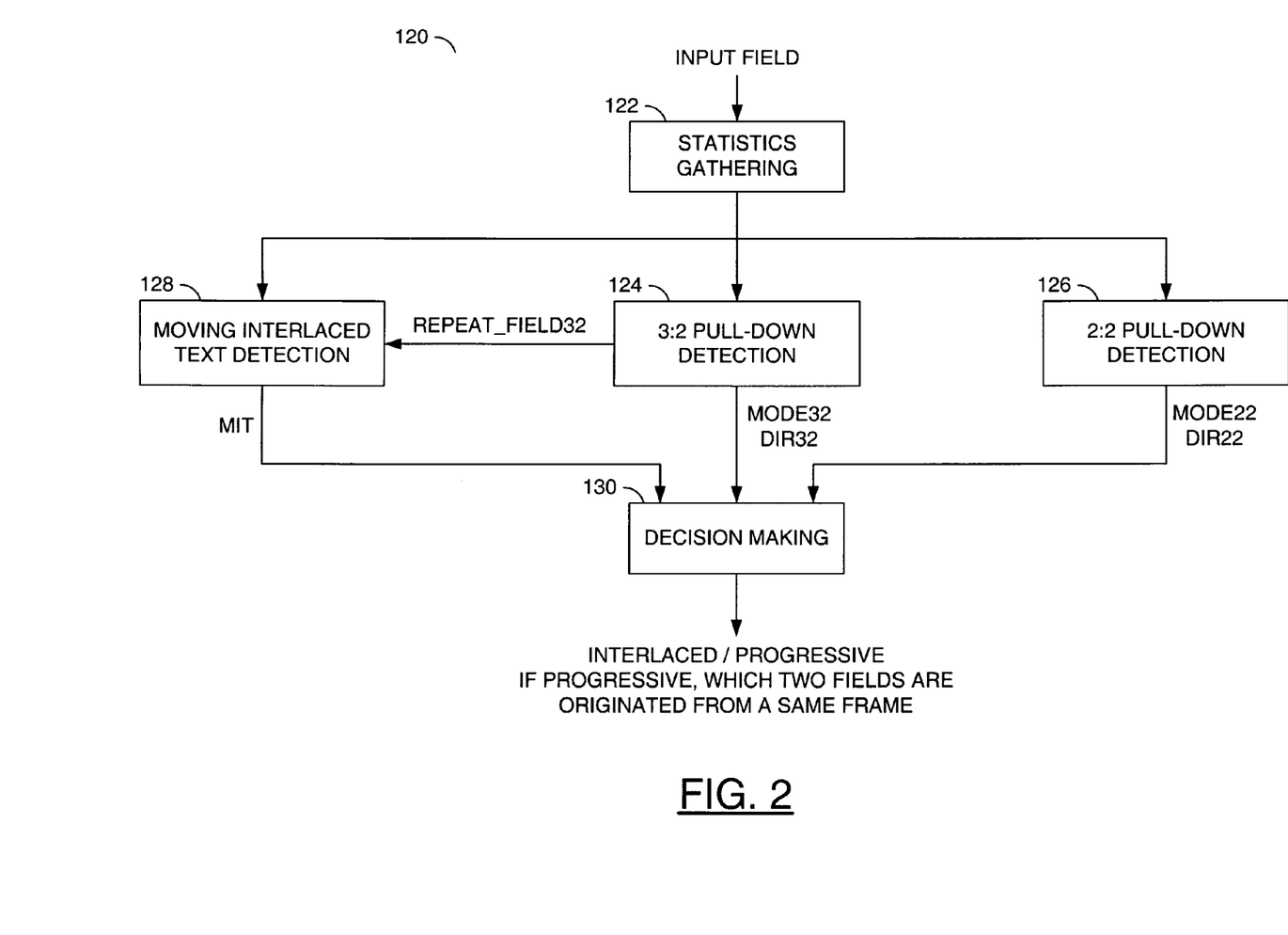
FIG. 2 is a flow diagram of an example method for a unified approach to film mode detection.

Referring to FIG. 2, a flow diagram of an example method 120 for a unified approach to film mode detection is shown. The method (or process) 120 generally comprises a step (or block) 122, a step (or block) 124, a step (or block) 126, a step (or block) 128 and a step (or block) 130.

For each input field received in the input signal IN, the video capture module 106 and/or the VDSP circuit 110 may gather (or calculate) statistics from the fields in the step 122. The statistics may be used by other steps to decide how to covert the fields into frames for the output signal OUT. Further details regarding the statistics are generally provided below.

Based on the gathered statistics, a 3:2 pull-down detection may be performed by the VDSP circuit 110 in the step 124. The detection may determine whether or not a regular 3:2 pull-down pattern exists in the input field sequence. The VDSP circuit 110 may generate one or more binary 3:2 pull-down flags (e.g., a telecine mode flag MODE32, a direction flag DIR32 and a repeated field flag REPEAT_FIELD32) as a result of the detection operation. When the flag MODE32 is asserted (e.g., a logical one or boolean true), the detected sequence is locked into the 3:2 pull-down mode. If the flag MODE32 is de-asserted (e.g., a logical zero or boolean false), the 3:2 pull-down mode has not been detected. In a case where MODE32 is asserted and DIR32 has a reverse direction (e.g., a logical one or "1"), the current field (e.g., $f_N$) and a preceding field (e.g., $f_{N-1}$) may have been detected as originating from a same progressive frame. In a case where MODE32 is asserted and DIR32 has a forward direction (e.g., a logical zero or "0") the current field $f_N$ and a next field (e.g., $f_{N+1}$) may have been detected as originating from a same progressive frame. An assertion (e.g., a logical one or boolean true) of the flag REPEAT_FIELD32 generally indicates that the current field $f_N$ has been detected as a repeated field of a previous same-polarity field (e.g., $f_{N-2}$). A de-assertion (e.g., a logical zero of boolean false) of the flag REPEAT_FIELD32 generally indicates that the current field $f_N$ has not been detected as a repeated field. The flag PREPEAT_FIELD32 may be available to the step 128. Further details of the 3:2 pull-down detection may be found in the co-pending U.S. patent application Ser. No. 11/272,300.

Based on the gathered statistics, a 2:2 pull-down detection may be performed by the VDSP circuit 110 in the step 126. The detection may determine whether or not a regular 2:2 pull-down pattern exists in the input field sequence. The VDSP circuit 110 may generate one or more binary 2:2 pull-down flags (e.g., a mode flag MODE22 flag and a direction flag DIR22) as a result of the detection operation. An assertion (e.g., a logical one or boolean true) of the flag MODE22 generally means that the sequence of fields is locked into the 2:2 pull-down mode. A de-assertion (e.g., a logical zero or boolean false) of the flag MODE22 may indicate that the 2:2 pull-down pattern was not detected. In a case where MODE22 is asserted and DIR22 indicates a reverse direction, the current field $f_N$ and the preceding field $f_{N-1}$ may have been detected as originating from a same progressive frame. In a case where MODE22 is asserted and DIR22 is de-asserted, the current field $f_N$ and the following field $f_{N+1}$ may have been detected as originating from a same progressive frame. Further details of the 2:2 pull-down detection may be, found in the co-pending U.S. patent application Ser. No. 11/272,300.

In the step 128, the VDSP circuit 110 may check the fields to determine if moving interlaced text is present. If moving interlaced is detected, the VDSP circuit 110 may also determine (i) if the movement is vertical or horizontal and (ii) if rows or columns contain the moving text as part of the step 128. The VDSP circuit 110 may generate a binary moving interlaced text flag (e.g., MIT) as a result of the detection operation. The flag MIT generally indicates whether or nor the current field $f_N$ contains moving interlaced text. An assertion (e.g., a logical one or boolean true) of the flag MIT generally means that the moving interlaced text has been detected. A de-assertion (e.g., a logical zero or boolean false) of the flag MIT generally indicates that no moving interlaced text was detected.

A final film mode decision is generally made by the VDSP circuit 110 in the step 130 according to a set of rules. The decision may be responsive to the flags MODE32, DIR32, MODE22, DIR22 and MIT. Based on the decision, one among a number of inverse telecine processes may be identified to de-interlace the fields back into the original film frames.

Figure 3:
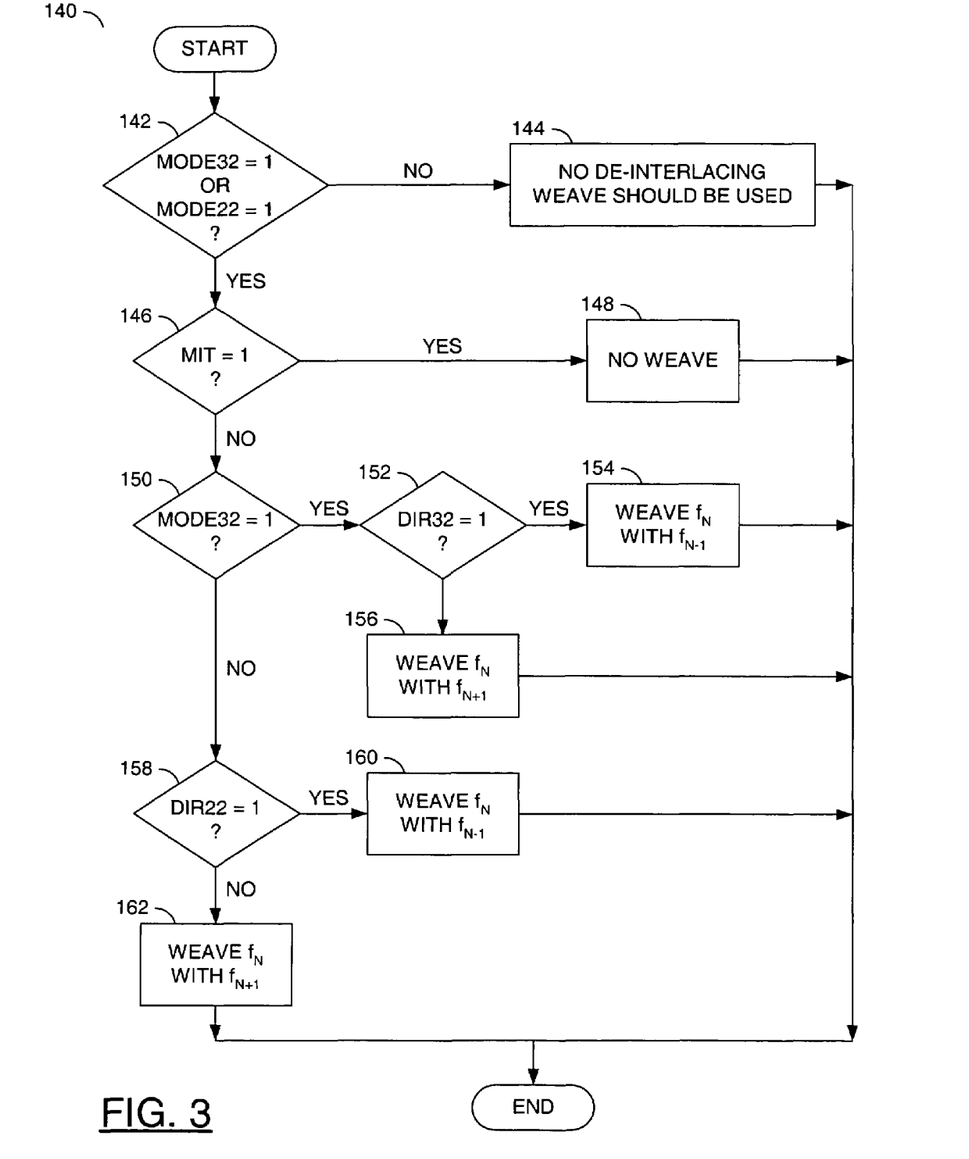
FIG. 3 is a flow diagram of an example implementation of a method for film mode decision making.

Referring to FIG. 3, a flow diagram of an example implementation of a method 140 for film mode decision making is shown. The method (or process) 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160 and a step (or block) 162.

The method 140 generally starts by checking if the flag MODE32 and/or the flag MODE 22 are asserted in the step 142. If neither of the flags MODE32 and MODE22 are asserted (e.g., the NO branch of step 142), the decision presented in the step 144 may indicate that the interlaced fields are part of an original interlaced sequence (e.g., a non-telecine sequence) and thus the weave inverse telecine process should not be used. Furthermore, the non-telecine fields should be presented in the signal OUT as interlaced fields.

If at least one of the flags MODE32 and MODE22 is asserted (e.g., the YES branch of the step 142), a check may be made of the flag MIT in the step 146. If the flag MIT is asserted to indicate moving interlaced text (e.g., the YES branch of step 146), the decision presented in the step 148 may indicate use of a non-weave inverse telecine process (e.g., the "bob" process). If the flag MIT is de-asserted to indicate that no moving interlaced text was detected (e.g., the NO branch of the step 146), a check may be made of the flag MODE32 in the step 150.

If the flag MODE32 is de-asserted (e.g., the YES branch of the step 150), a check of the flag DIR32 may be performed in the step 152. If the flag DIR32 indicates the reverse direction (e.g., the YES branch of the step 152), the decision presented in the step 154 may indicate the weave inverse telecine process to combine the current field $f_N$ with the previous field $f_{N-1}$. If the flag DIR32 indicates the forward direction (e.g., the NO branch of the step 152), the decision presented in the step 156 may indicate the weave inverse telecine process to combine the current field $f_N$ with the next field $f_{N+1}$.

If the flag MODE32 is de-asserted (e.g., the NO branch of the step 150), a check of the flag DIR22 may be performed in the step 158. If the flag DIR22 indicates the reverse direction (e.g., the YES branch of the step 158), the decision presented in the step 160 may indicate use of the weave inverse telecine process to combine the current field $f_N$ with the previous field $f_{N-1}$. If the flag DIR22 indicates the forward direction (e.g., the NO branch of the step 158), the decision presented in the step 162 may indicate use of the weave inverse telecine process to combine the current field $f_N$ with the next field $f_{N+1}$.

Referring again to FIG. 2, multiple type of statistics may be calculated from the fields in the step 122. The statistics for each field generally include (i) a vertical activity statistic, (ii) a previous-current row sum of absolute differences (SAD) statistic between the current field $f_N$ and the previous field $f_{N-1}$, (iii) a current-next row SAD statistic between said current field $f_N$ and the next field $f_{N+1}$ and/or (iv) a previous-next row SAD statistic between the previous field $f_{N-1}$ and the next field $f_{N+1}$. Other types of statistics may be calculated to meet the criteria of a particular application.

Figure 4:
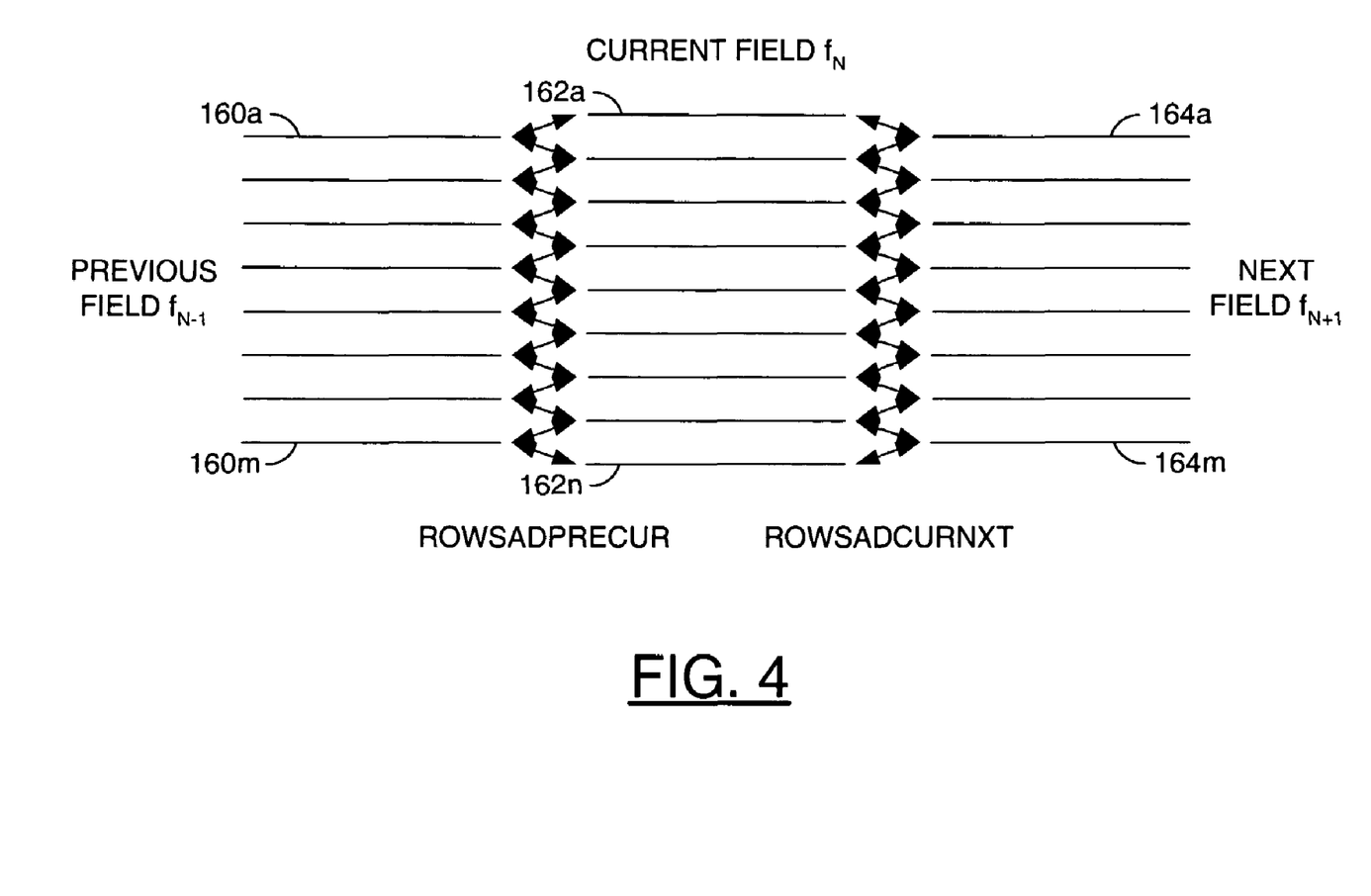
FIG. 4 is a diagram of three consecutive fields used to calculate a previous-current row sum of absolute differences (SAD) statistic and a current-next row SAD statistic.

Referring to FIG. 4, a diagram of three consecutive fields used to calculate the previous-current row SAD statistic and the current-next row SAD statistic is shown. The previous-current row SAD statistic (e.g., RowSadPreCur) may be calculated as an SAD between pixel rows 160a-160m in the previous field $f_{N-1}$ and co-located pixel rows 162a-162n in the current field $f_N$. The current-next row SAD statistic (e.g., RowSadCurNext) may be calculated as an SAD between the pixel rows 162a-162n in the current field $f_N$ and co-located pixel rows 164a-164m in the next field $f_{N+1}$. The calculations may be performed on a limited number of pixel rows at a time, repeated for the unprocessed pixel rows and the results combined. For example, a single calculation pass may operate on 9 pixel rows of the current field $f_N$ with 8 pixel rows in the previous field $f_{N-1}$ or the next field $f_{N+1}$. Multiple calculation passes may cover all of the pixel rows.

Figure 5:
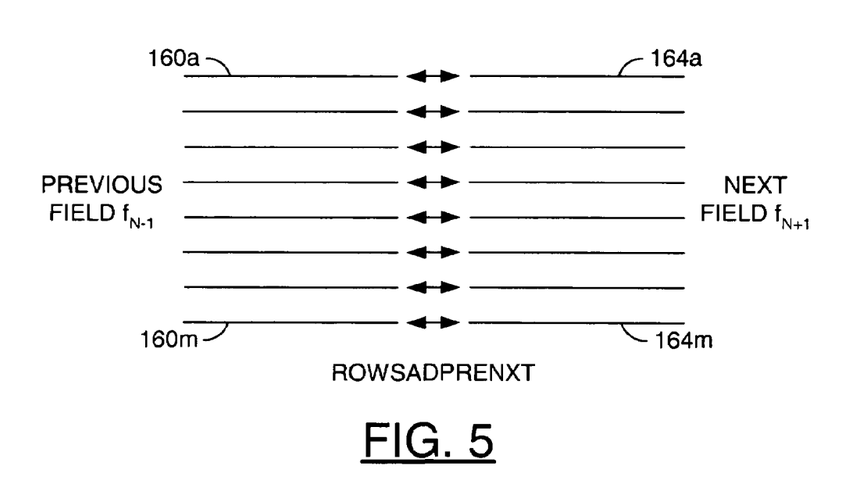
FIG. 5 is a diagram of two fields used to calculate a previous-next row SAD statistic.

Referring to FIG. 5, a diagram of two fields used to calculate the previous-next row SAD statistic is shown. The previous-next row SAD (e.g., the previous field $f_{N-1}$ and co-located pixel rows 164a-164n in the next field $f_{N+1}$. Pixel rows in field-boundary blocks may be excluded from the calculation.

Figure 6:
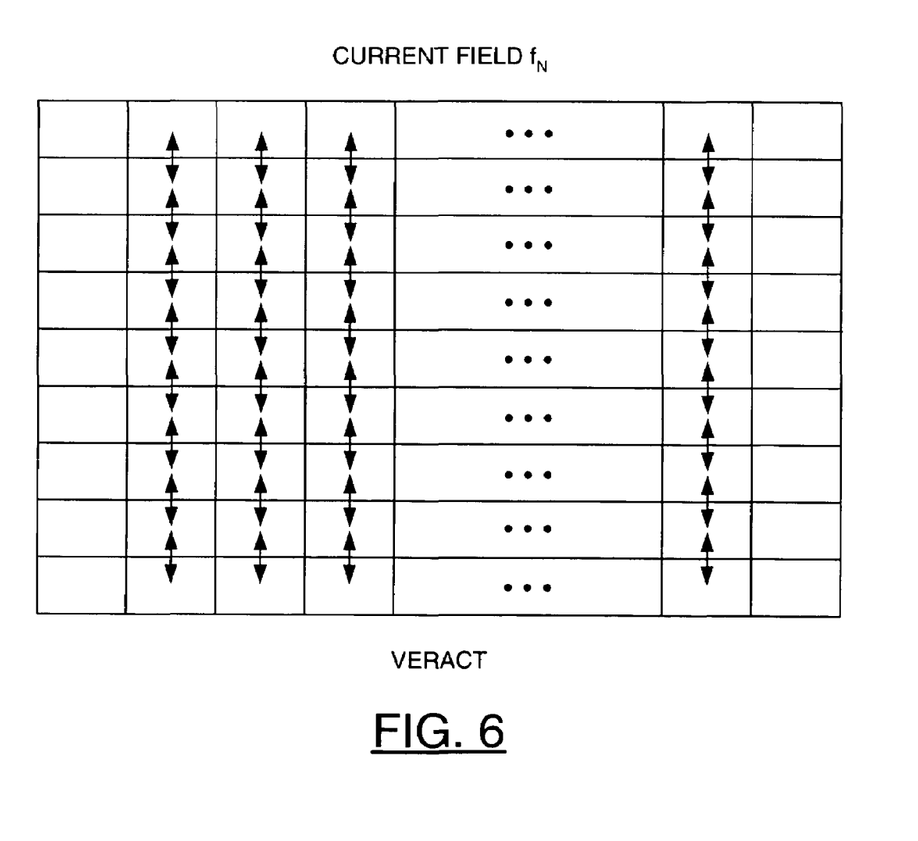
FIG. 6 is a diagram of blocks in a field used to calculate a vertical activity statistic.

Referring to FIG. 6, a diagram of blocks in a field used to calculate the vertical activity statistic is shown. The vertical activity statistic (e.g., RowVerActCur) may be calculated as summation of vertical activities in the current field $f_N$. The calculation may be performed in a limited number (e.g., 9) of pixel rows at a time, repeated for all unprocessed pixel rows and the results combined.

Referring again to FIG. 2, several aspects of the fields may be examined in the step 128 while searching for moving interlaced text. Text in the original film material should not be detected as moving interlaced text as such text is actually part of the original progressive frames from the film material. For sequences with stationary but fading text, if the fading is from field to field, the text should not be detected as moving interlaced text since the "weave" process may cause noticeable artifacts in the de-interlaced frames. Such sequences may be seen in some commercial breaks. The method for moving interlaced text detection generally consists of decisions at multiple (e.g., three) levels. A first level may be a block level indication of the moving interlaced text. A second level may be a row-of-block level indication of the moving interlaced text. The moving interlaced text commonly occurs in two cases, (i) a line of text scrolling in the horizontal direction in the picture and (ii) one line or multiple lines of text scrolling in the vertical direction. Therefore, a strong evidence regarding moving interlaced text may be collected from the maximum number of blocks in a row with the block level indication asserted. A third level may be a field level indication of moving interlaced text. For moving interlaced text, the following observations may be used in the decision rules. (1) Moving interlaced text almost always appears in a number of consecutive fields. (2) For horizontally scrolling text, two situations usually exist. In a first situation, the text may start to appear at one end of the picture and gradually move to the other end with more and more text shown. In a second situation, a line of text may appear at the center, of the picture and move toward an end. For the first situation, the viewer is normally tolerant of a failure to detect the moving text properly (e.g., a false negative) for the first several fields. The false negative may be tolerated since only a few text characters generally appear in the fields and the text usually appears at the corner of the picture. For the second situation, quick recognition the moving interlaced text may be useful since a line of text appearing at the center of the picture usually catches the viewer's attention almost immediately. For vertically scrolling text, the text may not appear in the same horizontal position in consecutive fields.

Figure 7:
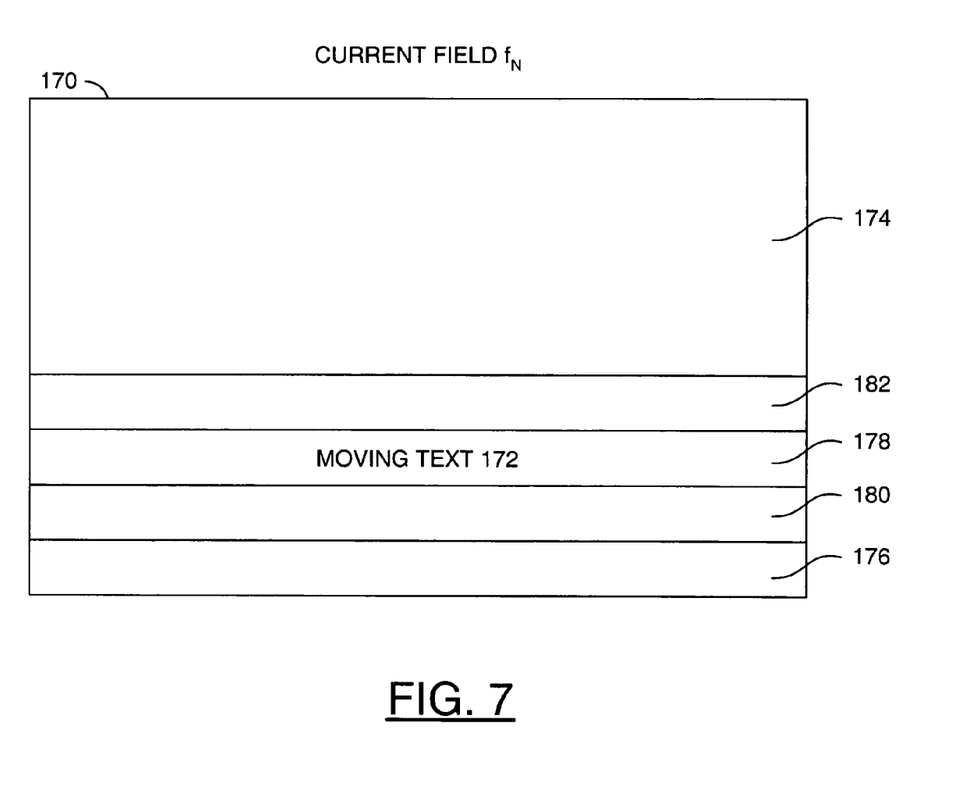
FIG. 7 is a diagram illustrating regions in a field containing moving interlaced text.

Referring to FIG. 7, a diagram illustrating regions in a field 170 containing moving interlaced text is shown. If moving interlaced text is detected in a sequence originated from film, the "weave" process may not be exclusively used in de-interlacing the fields. Where the location of the moving interlaced text may be correctly determined, (i) the "weave" process may still be used for one or more regions with no moving text, (ii) vertical blending may be used for one or more regions with moving text and (iii) a gradual transition approach may be used in one or more regions between the film regions and the moving interlaced text regions. For example, consider a current field 170 that was (i) detected as originating from a progressive frame and (ii) includes an overlaid horizontal moving interlaced text strip 172 starting from an upper pixel row (e.g., UP) and ending at a lower pixel row (e.g., DN). The "weave" process may be used for the film regions 174 and 176 defined by pixel rows 0 to UP−16 and from DN+16 to the bottom row in the current field $f_N$. A "spatial filtering" process may be used for the moving text region 178 containing the pixel rows from UP to DN. For a region 180 having the pixel rows from UP−15 to UP−1, both the "weave" process and the "spatial filtering" process may be performed and the results blended with a blending factor. The blending factor may gradually change from favoring the "weave" process at the row UP−15 to favoring the "spatial filtering" at process at the row UP−1. Similarly, for a region 182 having the pixel rows in DN+1 to DN+15, the "weave" process and the "spatial filtering" process results may be blended with the blending factor gradually changing from favoring the "spatial filtering" process at the row DN+1 to favoring the "weave" process at the row DN+15.

The present invention generally concerns the integration of 3:2 pull-down detection, 2:2 pull-down detection, and moving interlaced detection into a unified platform. Other features may include a hierarchical decision making as illustrated in FIG. 3, and use of the 3:2 pull-down detection results in the moving text detection as shown in FIG. 1. The network media system 100 may be capable of properly handling mixed contents in which 3:2 pull-down, 2:2 pull-down and moving interlaced text may coexist in a sequence with interlaced material. A single set of statistics may be calculated once and then used for all three detections, thus reducing computations costs compared with calculating separate statistics for each detection.

The present invention may be applied to one or more of the following scenarios. Video Coding: the knowledge of the picture type (e.g., progressive or interlaced, with text or not with text) may be beneficial to achieve better coding efficiency. Noise estimation and reduction: noise may be better estimated from repeated fields that may be detected from the 3:2 pull-down detection. Directional interpolation in de-interlacing: if the text is detected in an area of a picture, then the directional interpolation may be made more conservative since a wrong direction interpolation may cause noticeable artifacts in text.

The function performed by the block diagrams and flow diagrams of FIGS. 1-3 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for film mode detection, comprising the steps of:
   (A) gathering a plurality of statistics from a plurality of fields in a video signal using a circuit;

(B) detecting if said fields are in a 3:2 pull-down pattern to control a plurality of first flags based on said statistics;

(C) detecting if said fields contain moving interlaced text to control a second flag based on both (i) said statistics and (ii) a repeat-field flag of said first flags that indicates repeating consecutive same polarity fields; and (D) deciding among a plurality of inverse telecine processes to de-interlace said fields based on all of (i) a 3:2 mode flag of said first flags, (ii) a 3:2 direction flag of said first flags and (iii) said second flag, wherein said 3:2 direction flag distinguishes between (a) both a current field and a next field originating from a frame and (b) both said current field and a previous field originating from said frame.

2. The method according to claim 1, further comprising the step of:
detecting if said fields are in a 2:2 pull-down pattern based on said statistics to control a plurality of third flags, wherein the deciding step is further based on (i) a 2:2 mode flag of said third flags and (ii) a 2:2 direction flag of said third flags.

3. The method according to claim 2, wherein said statistics of said current field comprise (i) a vertical activity, (ii) a first row sum of absolute differences between said current field and said previous field, (iii) a second row sum of absolute differences between said current field and said next field and (iv) a third row sum of absolute differences between said previous field and said next field.

4. The method according to claim 1, wherein the step of deciding comprises the sub-step of:
deciding none of said inverse telecine processes if no telecine mode was detected.

5. The method according to claim 1, wherein the step of deciding comprises the sub-step of:
deciding a non-weave process of said inverse telecine processes if said second flag indicates that said moving interlace text is detected in said fields.

6. The method according to claim 1, wherein the step of deciding comprises the sub-step of:
deciding a weave process of said inverse telecine processes between said current field and one of (i) said previous field and (ii) said next field based on said both said 3:2 mode flag and said 3:2 direction flag.

7. The method according to claim 1, further comprising the step of:
de-interlacing a first portion of said fields lacking said moving interlaced text using a weave process of said inverse telecine processes while said second flag indicates that said moving interlaced text is present.

8. The method according to claim 7, further comprising the step of:
de-interlacing a second portion of said fields having said moving interlaced text using a spatial filter process of said inverse telecine processes.

9. The method according to claim 8, further comprising the step of:
de-interlacing a third portion of said fields between said first portion and said second portion using a gradual blend of said weave process and said spatial filter process.

10. A method for film mode detection, comprising the steps of:
(A) gathering a plurality of statistics from a plurality of fields in a video signal using a circuit;
(B) detecting if said fields are in a 2:2 pull-down pattern to control a plurality of first flags based on said statistics;
(C) detecting if said fields contain moving interlaced text to control a second flag based on said statistics; and
(D) deciding among a plurality of inverse telecine processes to de-interlace said fields based on all of (i) a 2:2 mode flag of said first flags, (ii) a 2:2 direction flag of said first flags and (iii) said second flag, wherein said 2:2 direction flag distinguishes between (a) both a current field and a next field originating from a frame and (b) both said current field and a previous field originating from said frame.

11. The method according to claim 10, further comprising the step of:
detecting if said fields are in a 3:2 pull-down pattern based on said statistics to control a plurality of third flags, wherein the deciding step is further based on (i) a 3:2 mode flag of said third flags and (ii) a 3:2 direction flag of said third flags.

12. The method according to claim 11, wherein control of said second flag is further based on a repeat-field flag of said third flags that indicates repeating consecutive same polarity fields.

13. The method according to claim 10, wherein the step of deciding comprises the sub-step of:
deciding none of said inverse telecine processes if no telecine mode was detected.

14. The method according to claim 10, wherein the step of deciding further comprises the sub-step of:
deciding a non-weave process of said inverse telecine processes if said second flag indicates that said moving interlace text is detected in said fields.

15. The method according to claim 10, wherein the step of deciding comprises the sub-step of:
deciding a weave process of said inverse telecine processes between said current field and one of (i) said previous field and (ii) said next field based on said both said 2:2 mode flag and said 2:2 direction flag.

16. A system comprising:
a memory configured to store a plurality of fields from a video signal; and
a first processor configured to (A) gather a plurality of statistics from said fields, (B) detect if said fields are in a 3:2 pull-down pattern to control a plurality of first flags based on a said statistics, (C) detect if said fields contain moving interlaced text to control a second flag based on both (i) said statistics and (ii) a repeat-field flag of said first flags that indicates repeating consecutive same polarity fields and (D) decide among a plurality of inverse telecine processes to de-interlace said fields based on all of (i) a 3:2 mode flag of said first flags, (ii) a 3:2 direction flag of said first flags and (iii) said second flag, wherein said 3:2 direction flag distinguishes between (a) both a current field and a next field originating from a frame and (b) both said current field and a previous field originating from said frame.

17. The system according to claim 16, wherein said first processor is further configured to detect if said fields are in a 2:2 pull-down pattern based on said statistics to control a plurality of third flags, wherein the deciding step is further based on (i) a 2:2 mode flag of said third flags and (ii) a 2:2 direction flag of said third flags.

18. The system according to claim 16, wherein said first processor comprises a video capture module configured to detect if said fields are in said 3:2 pull-down pattern.

19. The system according to claim 16, further comprising a second processor configured to detect if said fields are in said 3:2 pull-down pattern.

20. The system according to claim 16, further comprising a second processor configured to de-interlace said fields according to a particular one of said inverse telecine processes decided upon by said first processor.

21. The system according to claim 16, wherein step (D) decides none of said inverse telecine processes if no telecine mode was detected.

22. The system according to claim 16, wherein step (D) decides a non-weave process of said inverse telecine processes if said second flag indicates that said moving interlace text is detected in said fields.

23. The system according to claim 16, wherein step (B) asserts said second flag as true in response to said statistics indicating vertically moving interlaced text.

24. A system comprising:
   a memory configured to store a plurality of fields from a video signal; and
   a first processor configured to (A) gather a plurality of statistics from said fields, (B) detect if said fields are in a 2:2 pull-down pattern to control a plurality of first flags based on said statistics, (C) detect if said fields contain moving interlaced text to control a second flag based on said statistics and (D) decide among a plurality of inverse telecine processes to de-interlace said fields based on all of (i) a 2:2 mode flag of said first flags, (ii) a 2:2 direction flag of said first flags and (iii) said second flag, wherein said 2:2 direction flag distinguishes between (a) both a current field and a next field originating from a frame and (b) both said current field and a previous field originating from said frame.

25. The system according to claim 24, wherein said first processor is further configured to generate an output signal conveying said fields in an interlaced format in response to no telecine being detected.

26. The system according to claim 24, further comprising a second processor configured to de-interlace said fields according to a particular one of said inverse telecine process decided upon by said first processor.

27. The system according to claim 24, wherein step (D) decides none of said inverse telecine processes if no telecine mode was detected.

28. The system according to claim 24, wherein step (D) decides a non-weave process of said inverse telecine processes if said second flag indicates that said moving interlace text is detected in said fields.

29. The system according to claim 24, wherein step (B) asserts said second flag as true in response to said statistics indicating vertically moving interlaced text.

* * * * *